United States Patent [19]

Stelzer

[11] 3,844,626
[45] Oct. 29, 1974

[54] CONTROL VALVE AND SYSTEM
[75] Inventor: Raymond F. Stelzer, Bel Nor, Mo.
[73] Assignee: Wagner Electric Corporation, Parsippany, N.J.
[22] Filed: Aug. 5, 1971
[21] Appl. No.: 169,441

[52] U.S. Cl. .................................... 303/68, 303/9
[51] Int. Cl. ............................................ B60t 15/16
[58] Field of Search .............. 137/624.27; 251/94; 303/68, 71, 40, 36, 50, 9, 13

[56] References Cited
UNITED STATES PATENTS
3,504,946  4/1970  Valentine et al. ................ 303/13 X
3,504,947  4/1970  Valentine ........................... 303/13

Primary Examiner—Duane A. Reger

[57] ABSTRACT

A brake system for a vehicle having a brake adapted for energization in response to a spring setting pressure released actuator connected therewith is provided with a push-pull type control valve selectively operable to respectively apply the system's service and emergency fluid pressure to said actuator to effect the de-energization of said brake and also to vent the fluid pressure applied to said actuator to the atmosphere to effect the spring set energization of said brake. The control valve is also provided with resiliently urged means automatically actuated in response to a predetermined low service fluid pressure to vent the fluid pressure applied to the actuator to the atmosphere while isolating both the service and emergency fluid pressures.

13 Claims, 4 Drawing Figures

INVENTOR
RAYMOND F. STELZER
BY
Joseph E. Papin

CONTROL VALVE AND SYSTEM

This invention relates generally to control valves and in particular to push-pull type control valves for use in a fluid pressure system to control a spring set pressure released actuator thereof.

BACKGROUND OF THE INVENTION

In the past, tripping or automatically actuated push-pull type control valves have been utilized in fluid pressure systems for controlling the application and exhaustion of emergency fluid pressure to and from a fluid pressure responsive spring set brake actuator to effect the desired de-energization and energization thereof; however, an undesirable or disadvantageous feature of such past control valves and systems was that said control valve sensed or was automatically responsive to the emergency fluid pressure which it delivered to the system. In other words, such past control valves and systems were responsive to or detected a predetermined low system emergency fluid pressure, but said system was, in fact, normally operable in response to the service fluid pressure therein. Another disadvantageous or undesirable feature of such past control valves and systems was that the available system emergency fluid pressure was depleted along with the system service fluid pressure to the predetermined low value for tripping said system to vent the fluid pressure applied to the actuator to the atmosphere and effect spring set energization of said actuator wherein subsequent de-energization of said actuator in response to the emergency fluid pressure applied thereto was limited due to the predetermined low value of the emergency fluid pressure.

SUMMARY OF THE INVENTION

The principle object of the present invention is to respectively provide a brake system and a control valve therefor which overcomes the aforementioned undesirable and disadvantageous features of such past brake systems and control valves, and this, as well as other objects and advantageous features of the present invention, will become apparent hereinafter.

Briefly, the invention includes a brake system having a brake adapted for spring set energization by a spring setting pressure released actuator in response to fluid pressure applied thereto less than a predetermined value, and means automatically actuated in response to the predetermined value of the applied fluid pressure for venting fluid pressure applied to said actuator including other means for overriding the automatic actuation of said first named means to effect the application of other fluid pressure to said actuator. The invention also comprises a control valve having application means automatically actuated in response to a predetermined value of a control fluid pressure acting thereon to isolate the fluid pressure applied through said control valve from that supplied thereto and vent the applied fluid pressure to the atmosphere, and other means responsive to selective actuation of said application means to override the automatic actuation thereof for effecting the application through said control valve of another fluid pressure supplied thereto.

RELATED PATENTS

This patent application is related generally to the George W. Stearns U.S. Pat. application Ser. No. 137,798 filed Apr. 27, 1971; however, this present patent application is a patentably distinct improvement.

DESCRIPTION OF THE DRAWINGS

In the drawings which illustrate embodiments of the invention and wherein like numerals refer to like parts wherever they occur.

Figure 1:
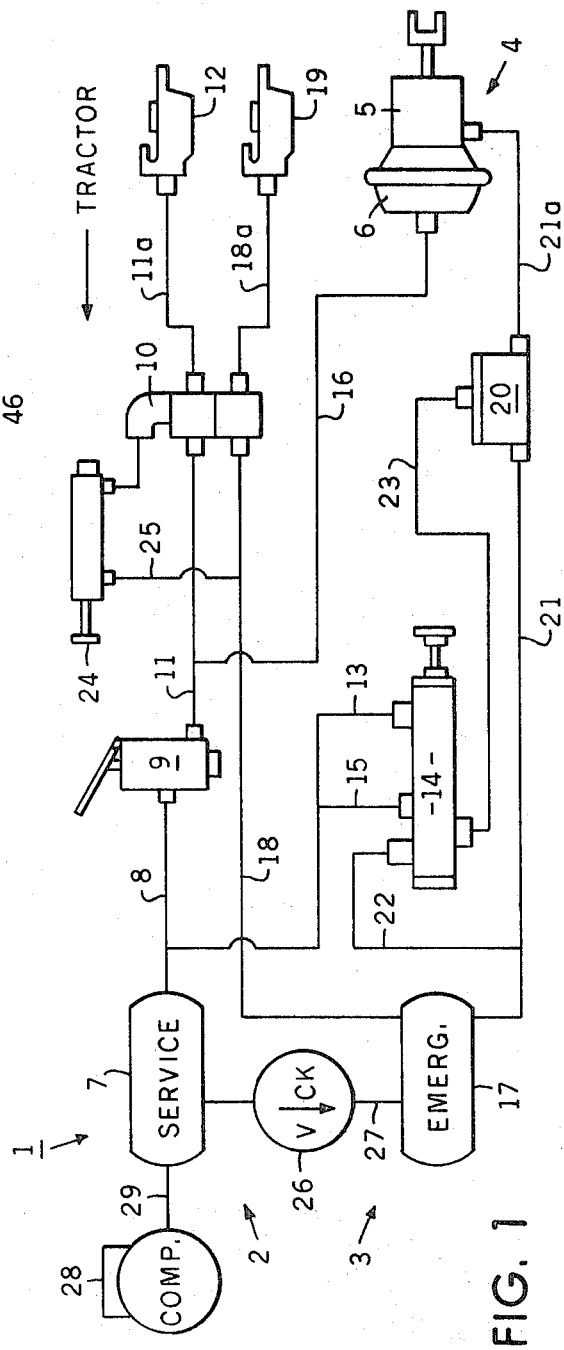
FIG. 1 is a schematic view of a brake system embodied in the present invention.

Referring now to the drawings in detail and in particular to FIG. 1, a dual fluid pressure system 1 having service and emergency branches, indicated generally at 2, 3, is shown for use on a vehicle having at least one spring setting pressure released brake cylinder or actuator 4 of a type well known in the art including an emergency or spring set portion or mechanism 5 and a service or fluid pressure responsive portion or motor 6 for energizing a vehicle brake (not shown). The service branch 2 generally is provided with a service reservoir or source 7 which is connected by a conduit 8 to the inlet side of an operator actuated application or foot valve 9 of the usual type well known in the art, and the service portion of a tractor protector valve 10 also of a type well known in the art, such as that shown in the Cyril B. Fites U.S. Pat. No. 2,859,763 issued Nov. 11, 1958, is interposed between conduits 11, 11a respectively connected with the outlet side of said foot valve and a service gladhand coupler 12 adapted for connection with the service system of a trailer vehicle (not shown). Another conduit 13 is connected between the conduit 8 and the control port of a push-pull type control or parking valve 14 having a branch portion or conduit 15 also connecting with the inlet port of said control valve, and another conduit 16 is connected between the conduit 11 and the service portion or motor 6 of the brake actuator 4.

The emergency branch 3 is generally provided with an emergency reservoir or source 17, and the emergency portion of the tractor protector valve 10 is interposed between conduits 18, 18a respectively connected with said emergency reservoir and an emergency gladhand coupler 19 adapted for connection with the emergency system of the trailer vehicle (not shown). The inlet and outlet sides of a ratio-relay, quick release valve 20 of a type well known in the art are interposed between conduits 21, 21a which are respectively connected with the emergency reservoir 17 and the emergency or spring set portion 5 of the brake actuator 4. A conduit 22 is connected between the conduit 21 and the emergency or other inlet port of the control valve 14, and another conduit 23 is connected between the outlet or delivery port of said control valve and the control side of the relay valve 20. A push-pull valve 24 of the "on-off" type well known in the art, is interposed in a conduit 25 connected between the conduit 18 and the control portion of the tractor protector valve 10, and a uni-directional or one-way check valve 26 is interposed in a conduit 27 connected between the service and emergency reservoirs 7, 17. The push-pull valve 24 is movable between its "on" position providing open pressure fluid communication therethrough and through the conduit 25 to the control side of the tractor protector valve 10 and its "off" position interrupting pressure fluid flow therethrough and venting the control side of said tractor protector valve to the atmosphere. To complete the description of the system 1, fluid pressure generating means, such as a compressor 28, are connected by a conduit 29 with the service reservoir 7.

Figure 2:
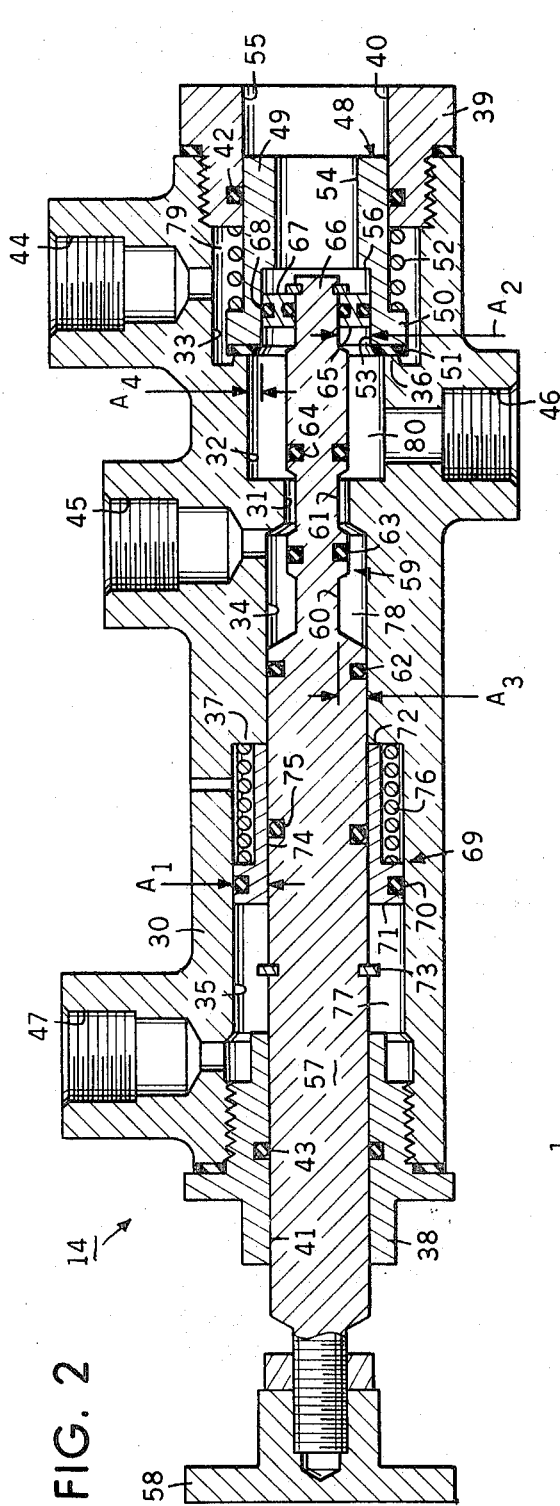
FIG. 2 is a sectional view illustrating the control valve of FIG. 1, also embodied in the present invention, in its normal operating or mid-position in cross-section.
Figure 3:
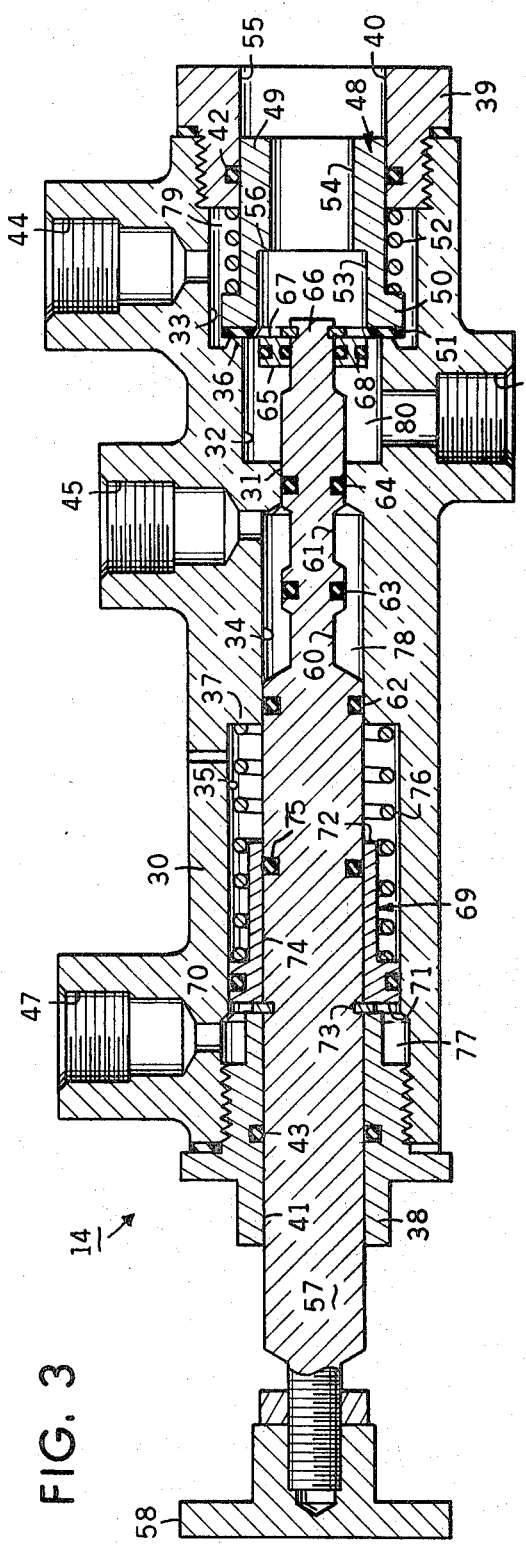
FIG. 3 is a sectional view illustrating the control valve of FIG. 2 in its "out" position in cross-section.
Figure 4:
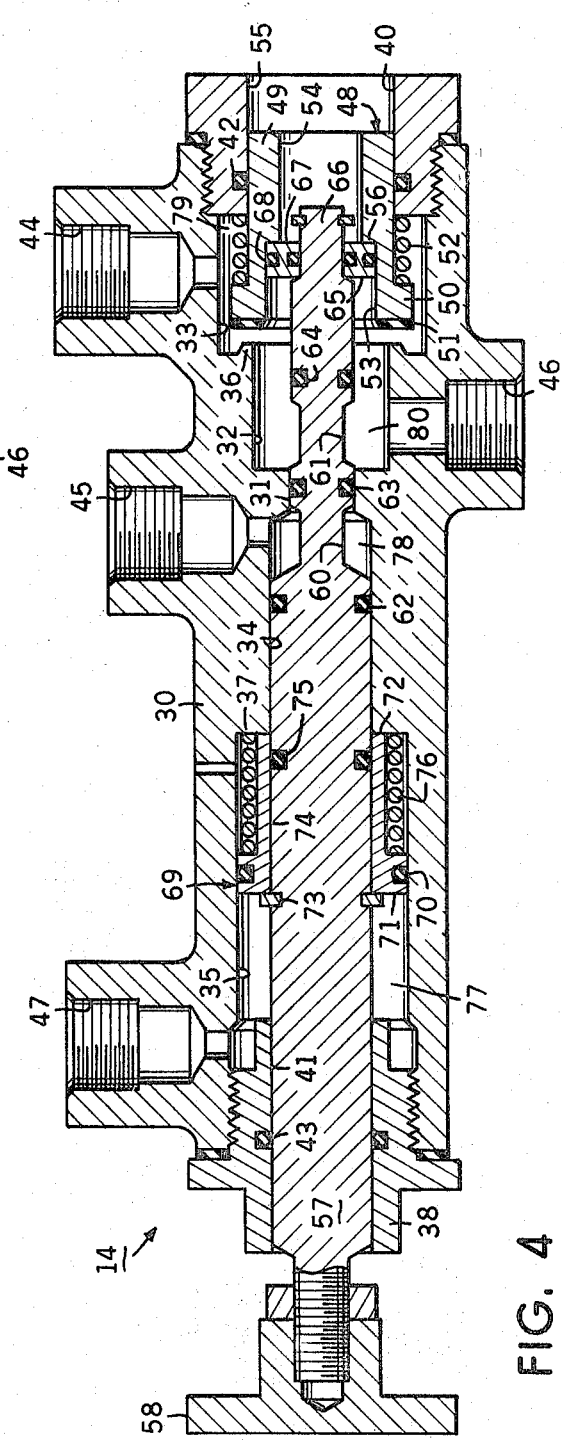
FIG. 4 is a sectional view of the control valve of FIG. 2 in its "in" position in cross-section.

Referring to FIGS. 2-4, the control valve 14 is provided with a housing 30 having a bore 31 therein which defines a valve seat interposed between opposed stepped counterbores 32, 33 and 34, 35, and opposed annular shoulders 36, 37 are provided on said housing between said stepped counterbores, respectively, said shoulder 36 defining a valve seat. Opposed closure members or end plugs 38, 39 are threadedly received in the open ends of counterbores 33, 35, and bores 40, 41 are axially provided through said closure members having seals 42, 43 disposed therein, respectively. Inlet ports 44, 45, which receive conduits 22, 15, as previously mentioned, are provided in the housing 30 intersecting with the counterbores 33, 34, and outlet and control ports 46, 47, which receive conduits 21, 13, as previously mentioned, are also provided in said housing intersecting with the counterbores 32, 35, respectively.

A resiliently urged member or valve element, such as the piston 48, is provided with a sleeve portion 49 which is slidably received in the closure member bore 40 in sealing engagement with the seal 42 disposed therein, and a radially extending head or flange portion 50 is integrally formed with said sleeve portion. An annular seal or valve member 51 is provided on the piston flange 50 and is normally urged into sealing engagement with the housing valve seat 36 by the compressive force of a spring 52 interposed between said piston flange and the closure member 38. Stepped bores 53, 54 are coaxially provided through the piston 48 defining an exhaust passage between the outlet port 46 and an exhaust port 55 defined by the exterior end portion of the closure member bore 40, and an annular shoulder 56 or abutment is provided on said piston between said stepped bores.

A selectively operable application member, such as the push rod indicated generally at 57, is provided with an exteriorly extending operator applied force receiving end or portion, such as the knob 58, and said rod extends coaxially through the counterbore 35 being slidably received in the housing counterbore 34 and closure member bore 41 in sealing engagement with the closure member seal 43. The rod 57 is provided with an integral reduced extension or portion 59 having spaced peripheral grooves 60, 61 therein, and seals 62, 63, 64 are carried in said rod intermediate said grooves and on the opposed sides thereof, respectively, said seal 62 being sealably engaged with the housing counterbore 34 and said seals 63, 64 defining valve members for selective sealing engagement with the housing bore or valve seat 31. A radially extending flange, such as the piston or valve member 65, is slidably received on the free end 66 of the rod 57 for lost motion driven engagement therewith and is slidably received in the stepped bore 53 of the piston 48, and a shoulder or abutment 67 is provided on said flange for driving engagement with the piston shoulder 56. A peripheral seal or valve element 68 is carried in said flange in sealing engagement with the piston stepped bore 53 to normally interrupt pressure fluid communication therethrough between the outlet and exhaust ports 46, 55.

An automatic actuating or resiliently urged member, such as control piston 69 is slidably received in the housing counterbore 35 having a peripheral seal 70 engaged therewith, and opposed ends or abutment surfaces 71, 72 are provided on said piston for abutting engagement with a snap ring or shoulder or abutment 73 provided on the rod 57 and the housing shoulder 37, respectively. An axial bore 74 is provided in the control piston 69 intersecting with the opposed ends 71, 72 thereof, and another seal 75 is peripherally carried in said rod in sealing engagement with said control piston bore. A spring 76 is pre-compressed between the housing shoulder 37 and the control piston 69 urging the piston end 71 toward driving engagement with the rod abutment 73 to normally urge said rod toward its "out" position, as shown in FIG. 4.

An expansible control chamber 77 is defined in the housing counterbore 35 between the closure member 39 and the control piston 69 in open pressure fluid communication with the control port 47. The rod 57 defines an inlet chamber 78 in the housing counterbore 34 between the rod seal 62 and the housing bore 31 in open pressure fluid communication with the inlet port 45, and the piston 48 defines another inlet chamber 79 in the housing counterbore 33 between the closure member 38 and the housing shoulder 36 in open pressure fluid communication with the inlet port 44. An outlet chamber 80 is provided in the housing counterbore 32 between the housing bore 31 and the piston 48 and flange 65 in open pressure fluid communication with the outlet port 46.

An annular effective area $A_1$ is defined on the control piston 69 in the control chamber 77 by the sealing engagements of the seals 70, 75 with the housing counterbore 35 and the control piston bore 74, respectively, and another annular effective area $A_2$ is defined on the rod flange 65 by the sealing engagements of the seals 68 and 63, 64 with the piston stepped bore 53 and the housing bore 31, respectively. To complete the description of the control valve 14, an annular effective area $A_3$ is defined on the rod 57 between the sealing engagement of the seal 62 with the housing counterbore 34 and the base portion of the rod groove 60, said area $A_3$ being opposed and substantially equal to the area $A_2$, and another annular effective area $A_4$ is defined on the piston 48 between the stepped bore 53 therein and the sealing engagement of the valve member 51 with the housing valve seat 36, said area $A_4$ being subjected to the fluid pressure in the outlet chamber 80 and additive to the area $A_2$.

OPERATION

With the component parts of the control valve 14 in their normal or mid-position as shown in FIG. 2, fluid pressure generated by the compressor 28 flows through the conduit 29 to the service reservoir 7 and therefrom through the conduct 27 and check valve 28 into the emergency reservoir 17. The service fluid pressure flows from the service reservoir 7 through conduits 8, 13 and 15 to the inlet and control ports 45, 47 of the control valve 14, and the fluid pressure flows from said control port into the control chamber 77 acting on the effective area $A_1$ of the control piston 69. When the control force Fc of the service fluid pressure in excess of a predetermined value, e.g., in the range of 20 to 45 p.s.i., acting on the control piston effective area $A_1$ overcomes the opposing compressive force of the spring 76, the control piston 69 is moved rightwardly against said spring toward an inoperative position disengaging the piston end or abutment 71 from the rod abutment 73 and engaging the piston end 72 with the housing shoulder 37. The service fluid pressure also flows from the control valve inlet port 45 through the housing bore 31 and counterbores 32, 33 of the control valve 14 to the outlet port 46 and therefrom through the conduit 23 to the control side of the relay valve 20 the effect actuation or cocking thereof. Upon the cocking of the relay valve 20 by the service fluid pressure, emergency fluid pressure in excess of another predetermined value, e.g., in the range of 90 to 120 p.s.i., is flowed therethrough from the emergency reservoir 17 and conduit 21 to the conduit 21a and the spring setting portion 5 of the brake actuator 4; therefore, when the emergency fluid pressure in excess of the other predetermined value is subjected to the brake actuator spring set portion 4, said brake actuator is de-actuated and the brake (not shown) operatively connected therewith is de-energized. It is contemplated that the ratio between the fluid pressure applied to the control side of the relay valve 20 is in a predetermined ratio, e.g., a 1:3 ratio with the fluid pressure applied through the inlet and outlet sides thereof to the actuator 4. Of course, the emergency fluid pressure also flows through the conduit 22 into the inlet port and chamber 44, 79 of the control valve and through the conduits 18, 25 and the push-pull valve 24 in its "on" position to the control portion of the tractor protector valve 10 to effect the cocking thereof. With the tractor-protector valve cocked, the service and emergency portions thereof are opened to permit the flow of emergency fluid pressure therethrough from the conduit 18 to the conduit 18a and gladhand 19 for connection with a trailer brake system (not shown) and to permit the selective flow of service fluid pressure from the service reservoir 7, conduit 8 and foot valve 9 through said tractor-protector service portion to the conduit 11a and service gladhand 12 to said trailer braking system. With the rod 57 in its mid-position, it should be noted that the service fluid pressure acting on the opposed substantially equal areas $A_2$, $A_3$ creates opposed substantially equal forces acting to substantially balance said rod on its mid-position.

In the event of the failure of the service fluid pressure due to compressor malfunction, a slow leak, a ruptured conduit or the like in the system service branch 2 wherein the service fluid pressure is reduced below the other predetermined value, the control force Fc is, of course, eliminated or correspondingly reduced in value, and the compressive force of the spring 76 is effective to automatically move the control piston 69 leftwardly effecting the driving engagement of the piston and rod abutments 71, 73 to concertedly drive the rod 57 either from its mid-position or its "in" position, as discussed hereinafter, to its "out" position, as shown in FIG. 3. In the "out" position of the rod 57, the valve member 64 is moved into engagement with the housing bore or seat 31 isolating the inlet port 45, and the valve member 68 is disengaged from the piston stepped bore or seat 53 to establish open pressure fluid communication between the outlet and exhaust ports 46, 55 thereby exhausting the service fluid pressure applied to the control side of the relay valve 20 causing it to uncock, i.e., to isolate the conduit 21 from the conduit 21a and vent the conduit 21a to the atmosphere effecting the exhaustion of the fluid pressure applied to the spring set portion 5 of the brake actuator 4; therefore, with the applied fluid pressure exhausted from said actuator, said spring set portion thereof is actuated to energize the brake (not shown) connected therewith. Of course, it is readily apparent that the rod 57 can be selectively or independently manually moved to its "out" position in response to an operator force selectively applied on the knob 58, and such selective manual movement of said rod is relative to the control piston 69 in its inoperative position when the service fluid pressure in the control chamber 77 acting on said control piston is in excess of the other predetermined value. If the rod 57 is selectively manually moved to its "out" position, the fluid pressure in the inlet chamber 78 acts on the effective area $A_3$ of the rod 57 to create a holding force which acts on said rod in a leftwardly direction tending to maintain said rod in its "out" position.

With the rod and control piston 57, 69 urged toward their respective "out" and operative positions by the force Fs of the spring 76, as described hereinbefore, the operator can, if desired, override the automatic actuation of the control valve 14 by the control piston and spring 69, 76. The override is accomplished by applying and maintaining a manual force on the exterior end 58 of the rod 57 to manually move said rod to its "in" position, as shown in FIG. 4, against the compressive forces of the springs 52, 76. In this manner, the rod 57 is moved rightwardly to engage the valve members 63, 68 with the housing bore and piston stepped bore 31, 53 isolating the inlet and exhaust ports 45, 55 and also re-engage the rod and piston abutments 67, 56. With the rod and piston abutments 67, 56 so engaged, the piston 48 is thereafter concertedly movable with the rod 57 to disengage valve member 51 thereof from the housing valve seat 36 and establish open pressure fluid communication between the inlet and outlet ports 44, 46 wherein emergency fluid pressure is applied from said inlet port through the housing counterbores 32, 33, said outlet port and the conduit 23 into the control portion of the relay valve 20 to again effect the cocking thereof providing the flow of emergency fluid pressure from said emergency reservoir to the spring set portion 5 of the brake actuator 4 to effect the deactuation thereof and the de-energization of the brake connected therewith. It is, of course, desirable to override the automatic function of the control valve 14 in order to temporarily de-actuate the brake actuator 4 and de-energize the brake to permit movement of the vehicle to a safe or off-the-road position until the service branch 2 can be repaired and the system 1 is once again operable. When the vehicle has been moved to the desired safe location for the repair of the system 1, the manually applied force is removed from the rod 57 wherein the compressive force of the spring 76 is again operable to concertedly drive the rod and control piston 57, 69 to their respective "out" and operative positions, and the compressive force of the spring 52 is operative to re-engage the valve member 51 with the housing valve seat 36 exhausting the applied fluid pressure from the control portion of the relay valve 20, as previously described, and from the spring set portion 5 of the brake actuator 4, as previously described, to again actuate said brake actuator and energize the brakes. Of course, it is again apparent that when the control piston 69 is urged to its inoperative position in response to the control force Fc acting thereon, the rod 57 is selectively movable from its "out" position to its "in" position independently of and relative to said control piston, and in this instance, it should be noted that the emergency fluid pressure so applied acts on the effective area $A_2$, $A_4$ of the rod and piston 57, 48 to create a holding force to maintain said rod in its "in" position when selectively moved thereto against the compressive force of the spring 52 and the additive force of the service fluid pressure in the inlet chamber 78 acting on the effective area $A_3$ of said rod.

In view of the foregoing, it is now apparent that a novel fluid pressure system 1 and control valve 14 therefor meeting the objects and advantages set out hereinbefore, as well as others, are provided and that changes as to the precise configurations, shapes, and details set forth in the disclosure by way of illustration may be made by those skilled in the art without departing from the spirit of the invention.

The embodiments of the invention in which an exclusive property or privilege is claimed are defined as follows:

1. A control valve comprising a housing having pressure fluid flow passage means therein including first and second passages respectively subjected to separate first and second supplied fluid pressures, and a passage portion interconnecting said passages in parallel flow relation, first and second valve seats on said housing about said first and second passages and between said first and second passages and said passage portion, respectively, a first valve member movable in said housing for engagement with said first valve seat, first spring means urging said first valve member toward engagement with said first valve seat to interrupt communication between said first passage and passage portion, an exhaust passage in said first valve member connecting with said passage portion, a third valve seat on said first valve member about said exhaust passage, a reciprocal rod member movable in said housing including spaced second and third valve members for respective engagement with said third valve seat and a fourth valve member for engagement with said third valve seat, a first abutment for driving engagement with said first valve member, and a force receiving portion extending exteriorly of said housing, said rod member being movable in response to an applied force in one direction on said force receiving portion between one position disengaging said second and third valve members from said second valve seat to effect the application of the second supplied fluid pressure through said second passage and passage portion and engaging said fourth valve member with said third valve seat to close said exhaust passage and another position engaging said second valve member with said second valve seat to isolate the second supplied fluid pressure in said second passage and effecting the driving engagement of said first abutment and first valve member to concertedly drive said first valve member against said first spring means toward a position disengaged from said first valve seat and effecting the application of the first supplied fluid pressure through said first passage and passage portion, said rod member also being movable in response to another applied force in a direction opposite to the one direction on said force recieving end toward a venting position disengaging said second valve member from said second valve seat and engaging said third valve member therewith to maintain the second supplied fluid pressure isolated in said second passage and disengaging said fourth valve member from said third valve seat to open said exhaust passage and exhaust the applied fluid pressure from said passage portion, said first spring means urging said first valve member in following relation with said rod member upon the movement thereof in the opposite direction to re-engage said first valve member with said first valve seat isolating the first supplied fluid pressure in said first passage prior to the disengagement of said fourth valve means from said third valve seat, a piston movable in said housing and defining therewith an expansible fluid pressure chamber subjected to the second supplied fluid pressure, said rod member extending through said chamber and piston, a second spring engaged with said piston and opposing fluid pressure expansion of said chamber, a second abutment on said housing for engagement with said piston, said piston being movable against said second spring toward engagement with said second abutment in response to the second supplied fluid pressure in excess of a predetermined value in said chamber acting on said piston, and a third abutment on said rod member in said chamber for driving engagement with said piston, said piston being movable in response to the force of said second spring to effect the driving engagement with said third abutment and concertedly drive said rod member to its venting position independently of an applied force on the force receiving end thereof when the second supplied fluid pressure in said chamber acting on said piston is less than the predetermined value.

2. A control valve comprising a housing having a pair of inlet ports, an outlet port and an exhaust port, first valve means movable in said housing for controlling pressure fluid communication between one of said inlet ports and said outlet port, a valve operating member movable in said housing between a normal position and opposed translated positions including spaced second and third valve means for controlling pressure fluid communication between the other of said inlet ports and said outlet ports, and fourth valve means for controlling pressure fluid communication between said outlet and exhaust ports, said second and third valve means being positioned to establish pressure fluid communication between said other inlet port and said outlet port and said fourth valve means positioned to interrupt pressure fluid communication between said outlet and exhaust ports when said valve operating member is in its normal position, said valve operating member being movable toward one of its opposed translated positions in response to an applied force to move one of said second and third valve means and said fourth valve means toward positions interrupting pressure fluid communication between said other inlet port and said outlet port and establishing pressure fluid communication between said outlet and exhaust ports, respectively, abutment means on said valve operating member for driving engagement with said first named valve means, said valve operating member also being movable from its normal position toward the other of its opposed translated positions in response to an applied force to move the other of said second and third valve means toward a position interrupting pressure fluid communication between said other inlet port and said outlet port and to drivingly engage said abutment means with said first named valve means urging it toward a position establishing pressure fluid communication between said one inlet port and said outlet port, and said fourth valve means being positioned to interrupt pressure fluid communication between said outlet and exhaust port upon the movement of said valve operating member to its other translated position.

3. A control valve according to claim 2, comprising a valve seat in said housing between said one inlet port and said outlet port for engagement with said first valve means, said first valve means being normally urged toward engagement with said valve seat to interrupt pressure fluid communication between said one inlet port and said outlet port and said first valve means being actuated toward a position disengaged from said valve seat upon the movement of said valve operating member to its other translated position.

4. A control valve according to claim 2, comprising passage means in said first valve means between said outlet and exhaust ports defining a valve seat for engagement with said fourth valve means, said fourth valve means being engaged with said valve seat to interrupt pressure fluid communication between said outlet and exhaust ports when said valve operating member is in its normal position and other translated position and said fourth valve means being actuated toward a position disengaged from said valve seat to establish pressure fluid communication between said outlet and exhaust ports upon the movement of said valve operating member to its one translated position.

5. A control valve according to claim 2, comprising a valve seat in said housing between said other inlet port and said outlet port for engagement with said second and third valve means, said second and third valve means being disengaged from said valve seat to establish pressure fluid communication between said other inlet port and outlet port when said valve operating member is in its normal position and said one and other of said second and third valve means being actuated into engagement with said valve seat to interrupt pressure fluid communication between said other inlet port and outlet port upon the movement of said valve operating member toward its one and other translated positions, respectively.

6. A control valve according to claim 2, comprising resiliently urged means movable in said housing and defining therewith a chamber subjected to a control fluid pressure, a bore in said resiliently urged means in which said valve operating member is reciprocally received, and other abutment means on said resiliently urged means for driving engagement with said valve operating member, said resiliently urged means being movable in response to its own force to drivingly engage said other abutment means with said valve operating member to concertedly move said valve operating member to its one translated position when the control fluid pressure in said chamber acting on said resiliently urged means is less than a predetermined value.

7. A control valve according to claim 6, comprising an effective area on said resiliently urged means within said chamber and subjected to the control fluid pressure, said resiliently urged means being movable against its own force toward an inoperative position in said housing in response to the control fluid pressure in excess of the predetermined value acting on said area and said resiliently urged means being movable in response to its own force toward an operative position in said housing drivingly engaging said other abutment means with said valve operating member when the control fluid pressure acting on said area is less than the predetermined value.

8. A control valve according to claim 7, wherein said resiliently urged means includes piston means slidable in said housing and having opposed end portions, said bore being in said piston means and intersecting with said opposed end portions, one of said opposed end portions defining with said housing said chamber, said area and other abutment means being defined on said one end portion, and spring means engaged between said piston means and housing urging said other abutment means toward driving engagement with said valve operating member, the other of said end portions being engaged with said housing when said piston means is in the inoperative position.

9. A control valve according to claim 2, comprising a pair of substantially equal and opposite effective areas on said valve operating member, one and the other of said areas being respectively subjected to the fluid pressure at said other inlet port and the atmosphere at said outlet port when said valve operating member is in its one translated position to establish a holding force urging said valve operating member toward its one translated position.

10. A control valve according to claim 2, comprising a pair of additive effective areas on said valve operating member and said first valve means subjected to the fluid pressure at said one inlet port when said valve operating member is in its other translated positions, the inlet fluid pressure at said one inlet port acting on said areas to establish additive holding forces urging said first valve means toward its pressure fluid communication establishing position and urging said valve operating member toward its other translated position when said valve operating member is in its other translated position.

11. A control valve according to claim 2, comprising a first valve seat on said housing between said one inlet port and said outlet port for engagement with said first valve means, said first valve means normally being urged into engagement with said first valve seat to interrupt pressure fluid communication between said one inlet port and said outlet port and said first valve means being actuated toward a position disengaged from said first valve seat to establish pressure fluid communication between said one inlet port and said outlet port upon the movement of said valve operating member to its other translated position, a second valve seat in said housing between said other inlet port and said outlet port for engagement with said second and third valve means, said second and third valve means being disengaged from said second valve seat to establish pressure fluid communication between said other inlet port and said outlet port when said valve operating member is in its normal position and said one and other of said second and third valve means being actuated into engagement with said second valve seat to interrupt pressure fluid communication between said other inlet port and said outlet port upon the movement of said valve operating member to its one and other translated positions, respectively, and a third valve seat on said first valve means between said outlet and exhaust ports for engagement with said fourth valve means, said fourth valve means being engaged with said third valve seat to interrupt pressure fluid communication between said outlet and exhaust ports when said valve operating member is in its normal and other translated positions and said fourth valve means being actuated toward a position disengaged from said third valve seat upon the movement of said valve operating member to its one translated position.

12. A control valve according to claim 11, comprising a control port in said housing, piston means movable in said housing and having opposed end portions, one of said opposed end portions defining with said housing an expansible fluid pressure chamber connected with said control port, a bore in said piston means intersecting wtih said opposed end portions, said valve operating member being reciprocally received in said bore, spring means engaged between said housing and piston means opposing fluid pressure expansion of said chamber, second abutment means on said housing for engagement with the other of said opposed end portions, said piston means being movable in said housing against the force of said spring means toward a position engaging said other opposed end portion with said second abutment means when the fluid pressure at said control port acting on said one end portion exceeds a predetermined value, and third abutment means on said other means for engagement with said one opposed end portion, said piston means being movable in response to the force of said spring means to drivingly engage said one opposed end portion with said third abutment means and concertedly move said valve operating member to its one translated position when the fluid pressure at said control port acting on said one end portion is less than the predetermined value.

13. A control valve according to claim 12, wherein said valve operating member includes a rod having a midportion slidable in said bore and said housing and an applied force receiving end extending through said chamber exteriorly of said housing, and said second, third and fourth valve means and said first named abutment means being on the end portion of said rod member opposite to the applied force receiving end thereof.

* * * * *